Dec. 31, 1963  H. H. BREAULT  3,116,116
GAS PRODUCTION
Filed March 23, 1961
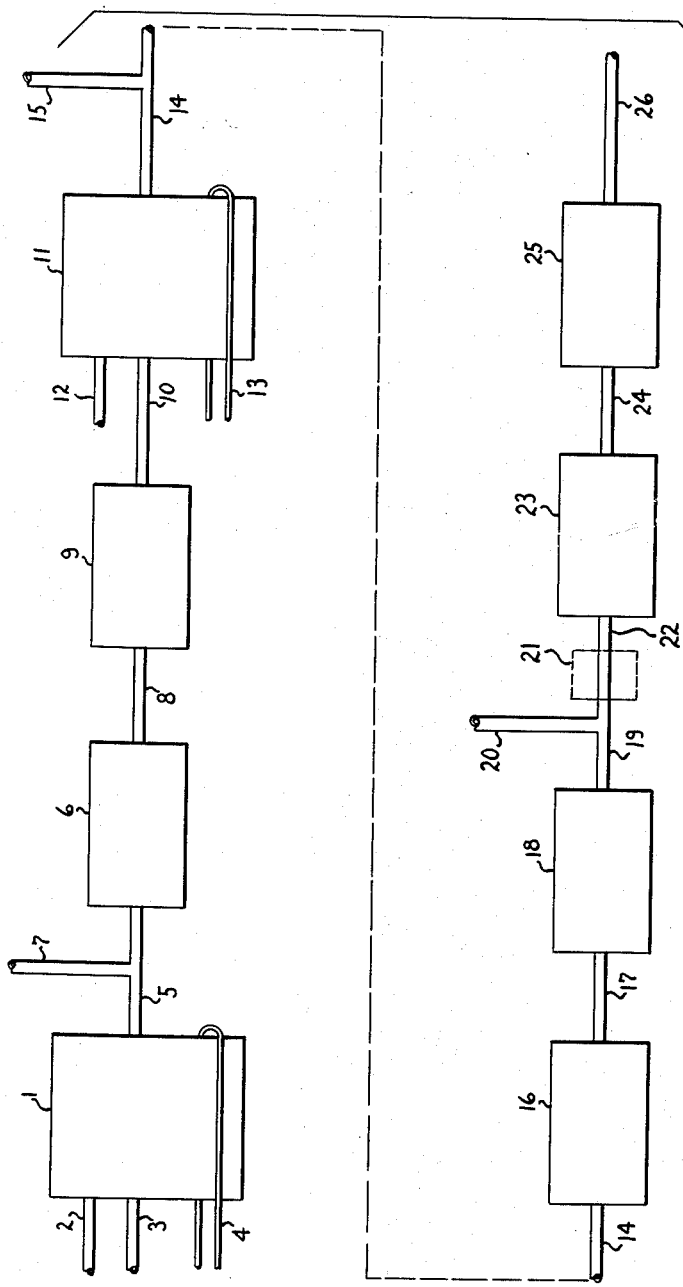
INVENTOR.
HOMER H. BREAULT
BY *Vernon F. Kalb*
ATTORNEY

United States Patent Office

3,116,116
Patented Dec. 31, 1963

3,116,116
GAS PRODUCTION
Homer H. Breault, Shelbyville, Ind., assignor to General Electric Company, a corporation of New York
Filed Mar. 23, 1961, Ser. No. 97,854
7 Claims. (Cl. 23—212)

This invention relates to the production of high purity hydrogen and to apparatus for producing such hydrogen. More particularly, it relates to high purity hydrogen prepared from the thermal cracking of gases with steam which utilizes a unique reforming step for the removal of hydrocarbon gases.

While high purity hydrogen is available at the present time, it is relatively expensive. Furthermore, high purity hydrogen containing little or no methane is difficult to produce. This unduly raises the cost of hydrogen which for certain metallurgical processes and the like must be practically free of impurities, such as methane.

A principal object of this invention is to provide a method and apparatus for the production of high purity hydrogen which is simple and can be made available and as a packaged unit at the place of consumption.

Briefly, the invention includes the reaction or cracking of a gas such as methane gas, propane, butane, and the like, in the presence of from 1 to 5 parts by volume of steam, removing carbon monoxide therefrom and carbon dioxide. Thereafter, the gaseous product is subjected to a second reforming stage, again, in the presence of from 1 to 5 parts by volume of steam for each part of gas. Once again, the gases are subjected to a carbon monoxide removing step and a carbon dioxide removing stage which is repeated to produce final high purity hydrogen.

Those features of the invention which are believed to be novel are set forth with particularity in the claims appended hereto. The invention will, however, be better understood and further advantages and objects thereof appreciated from a consideration of the following description and the drawing in which the single FIGURE shows schematically the process of the present invention.

In carrying out the first reforming stage, one part by volume of natural gas, propane, butane, or other similar gas containing hydrogen in the form of hydrocarbons is mixed with from 1 to 5 parts by volume of steam, preferably at a pressure of 15 p.s.i.g. and a temperature of 1500° F. in the presence of a well known suitable catalyst, such as nickel. It will be realized that the operating parameters of this reforming stage can be varied in different respects. For example, pressures as high as from 300 to 350 p.s.i.g. can be used. Likewise, temperatures ranging from about 1350° F. to 1800° F. can be utilized. However, at temperatures of about 1800° F., a low tube life in the reforming apparatus is experienced.

There is added to the effluent composition from the reforming stage, steam to adjust the temperature of the effluent gas to about 800° F., such cooled gas being passed over a carbon monoxide shift catalyst which typically consists of ferrous oxide and chromic oxide as in the form of a tabletted mixture. Such catalysts are well known in the art and any of the useful catalysts for such purpose can be used. Next, the gas with reduced carbon monoxide is subjected to an amine scrubbing stage which serves to remove some of the carbon dioxide. This stage is preferably carried out at a temperature of about 100° F., although temperatures of from about 70° F. to 120° F. can be utilized. The normal aqueous solutions of amines well known to those skilled in the art, such as monoethanolamine, diethanolamine and triethanolamine, among others, may be used.

While the carbon monoxide and carbon dioxide contents of the gas are substantially reduced by the foregoing stages, the methane content, which as pointed out above is objectionable in many applications, is still undesirably high. The effluent gas from the carbon dioxide scrubber is therefore, according to this invention, subjected to a second main reforming stage in the absence of air or other oxidizers at a pressure of 7.5 p.s.i.g. and a temperature of 1500° F. and broadly at a temperature of 1350° F. to 1800° F., from 1 to 5 parts by volume of steam being added for each part of gas. In order to facilitate the reforming step, a catalyst, such as nickel, thinly coated on ceramic rings, spheres, and the like, may be used. After the second reforming, steam is once again added to the effluent gas which is cooled thereby to a temperature of about 750° F. and again passed through a carbon monoxide shift catalyst for the removal of further carbon monoxide. This effluent gas preferably at a temperature of 100° F. and more broadly at a temperature of from 70° F. to 120° F. is passed through an amine scrubber as that above for the removal of further carbon dioxide. In order to remove still further quantities of carbon monoxide and carbon dioxide, the carbon monoxide shift catalyst stages and amine carbon dioxide scrubbing stages are repeated once again.

The following example will illustrate a specific embodiment of the present invention, it being realized that certain variations may be made therein without departing from the true spirit and scope of the invention.

Referring to the drawing, there is shown a reformer containing reactor or reformer tubes 1 having gas inlet pipe 2 and steam inlet pipe 3 leading thereinto along with means for heating said reforming receptacle ideally represented by heating coil 4, it being realized that other means for heating said reactor or reformer may be utilized. Reformer 1 can be packed with well-known catalyst-treated ceramic or other pellets to facilitate the reforming process. Effluent gas from the first reforming stage passes through pipe 5 to reactor 6 containing a carbon monoxide shift catalyst as above for maintaining the temperature. A steam pipe 7 leads into conduit 5 as shown for the purpose of cooling the effluent gas from reformer 1. Conduit or pipe 8 conveys the effluent gas from the carbon monoxide shift tank 6 to amine scrubber tank 9, where, as pointed out above, the gas is treated as with an aqueous solution of an amine to reduce the carbon dioxide content. Gas from scrubber 9 is lead by conduit 10 to a second reformer reactor 11 which is similar to reformer 1 having an inlet steam pipe 12 and heating means 13 to maintain the temperature of the gaseous mixture. From the second reformer 11, the gas passes through conduit 14 which has an inlet steam pipe 15 for the purpose of reducing the temperature of the effluent gas before it enters a second carbon monoxide shift catalyst treating tank 16 which is similar to 6. From treating tank 16, the effluent gas passes through conduit 17 to a second amine scrubber tank 18 which is similar to 9. The effluent gas from the second amine scrubber is lead through conduit 19 having a steam inlet pipe 20 for adding steam in a heater 21. The effluent gas from the heater is lead through conduit 22 to carbon monoxide shift catalyst treating tank 23. Finally, the effluent gas from this third carbon monoxide removal device passes through conduit or pipe 24 to a third amine scrubber 25 for still further removal of carbon dioxide, the final effluent gas being drawn off through conduit 26.

The following example will illustrate the practice of the invention, it being realized, of course, that other gases containing hydrogen and carbon in free and combined forms may be substituted for the gas in the example. One part by volume of natural gas essentially methane and containing by volume percent:

| | |
|---|---|
| $CO_2$ | 1.2 |
| $N_2$ | 0.74 |
| $CH_4$ | 93.26 |
| $C_2H_6$ | 3.84 |
| $C_3H_8$ | 0.65 |
| $C_4H_{10}$ | 0.16 |
| $C_5H_{12}$ | 0.05 |
| $C_6H_{14}$ | 0.06 |
| Heptanes | 0.04 | was combined in a first reformer 1 with 3 parts of steam at a pressure of 15 p.s.i.g. at a temperature of 1500° F., the effluent composition calculated on a dry volumetric basis containing 7.6% carbon dioxide, 15.4% carbon monoxide, 76.8% hydrogen and 0.2% methane. The effluent gas was cooled by the addition of cooling steam to a temperature of 800° F. and passed through a carbon monxide shift catalyst treating tank, such as 6, whereupon the composition on a dry volumetric basis contained 18.4% carbon dioxide, 2.0% carbon monoxide, .2% methane and 79.4% hydrogen. Next, the gas was passed through amine scrubber 9 at a temperature of about 100° F., the $CO_2$ removal step reducing the carbon dioxide in the effluent gas to 0.10%, the remainder of the constituents of the effluent gas were carbon monoxide 2.45%, methane .25% and hydrogen 97.20%. While for many purposes the relatively small amounts of methane, carbon monoxide and carbon dioxide in this effluent gas woud be very useful, for many metallurgical and other purposes where a high purity hydrogen must be used, this gas would be deficient in many respects. Therefore, according to this invention, the effluent gas from the first amine scrubber is subjected to a second reforming stage at a pressure of 7.5 p.s.i.g. and a temperature of 1500° F., there being added to each volume of inlet gas 3 volumes of steam. The efficacy of the second reforming stage will be appreciated from the fact that the effluent gas contains only 0.0067 volume percent of methane. The volume percentages of other constituents were 1.28% carbon dioxide, 1.71% carbon monoxide, and 97.0% hydrogen. To still further reduce the carbon monoxide content of 1.71 volume percent, the effluent gas was cooled with steam to 750° F. and passed through a second carbon monoxide shift catalyst treating tank, the effluent gas containing 2.79% carbon dioxide, 0.20% carbon monoxide, 0.0067% methane and 97.00% hydrogen. A second amine scrubing step 18 at 100° F. was utilized to reduce the carbon dioxide content to 0.02% with the remainder of the constituents at 0.21% carbon monoxide, 0.0069% methane and 99.76% hydrogen. A third carbon monoxide shift catalyst stage at a temperature of 700° F. to reduce the carbon monoxide content to 0.02% with the remainder of the constituents at 0.21% carbon dioxide, 0.007% methane and 99.76% hydrogen is next entered into. A final amine scrubber at 100° F. was employed in tank 23 to reduce the carbon dioxide volume to 0.002% with the carbon monoxide at 0.02%, the methane at 0.007% and the hydrogen at 99.97%.

There is provided then in the process of producing hydrogen from the reforming of hydrocarbon containing gases, means for reducing the content of hydrocarbons, such as methane, to extremely low amounts thereby enhancing the value of the resulting high purity hydrogen gas for metallurgical or other processes.

What I claim as new and desire to secure by Letters Patent of the United States is:

1. In the process of producing hydrogen from the steam thermal cracking of gas containing hydrocarbons, the steps of subjecting effluent gas from the primary steam reforming stage of said process to treatments for the removal of carbon monoxide and carbon dioxide and to a second steam hydrocarbon reforming stage in the absence of air and further treating for the removal of carbon monoxide and carbon dioxide.

2. In the process of producing hydrogen from the steam thermal cracking of gas containing hydrocarbons, the steps of subjecting effluent gas from the primary steam reforming stage of said process to treatments for the removal of carbon monoxide and carbon dioxide and to a second steam hydrocarbon reforming stage in the absence of air and at a pressure of up to 350 p.s.i.g. and a temperature of from about 1350° F. to 1800° F. and further treating for the removal of carbon monoxide and carbon dioxide.

3. In the process of producing hydrogen from the steam thermal cracking of gas containing hydrocarbons, the steps of subjecting effluent gas from the first primary steam reforming stageof said process to treatments for the removal of carbon monoxide and carbon dioxide and to a second primary steam hydrocarbon reforming stage in the absence of air at a pressure of up to 350 p.s.i.g. and a temperature of from about 1350° F. to 1800° F., there being from about 1 to 5 parts by volume of steam for each part of gas to be reformed and further treating for the removal of carbon monoxide and carbon dioxide.

4. In the process of producing hydrogen from the steam thermal cracking of gas containing hydrocarbons, the steps of subjecting effluent gas from the first primary steam reforming stage of said process to treatments for the removal of carbon monoxide and carbon dioxide and to a second primary steam hydrocarbon reforming stage in the absence of air at a pressure of about 15 p.s.i.g. and at a temperature of 1500° F, there being three volumes of steam for each volume of gas and further treating for the removal of carbon monoxide and carbon dioxide.

5. In the process of producing hydrogen from the steam thermal cracking of gas containing hydrocarbons, the steps of subjecting effluent gas from the primary steam reforming stage of said process to treatments for the removal of carbon monoxide and carbon dioxide and to a second steam hydrocarbon reforming stage in the absence of air and at a pressure of about 7.5 p.s.i.g. and a temperature of 1500° F., there being about one to five parts by volume of steam for each volume of gas and further treating for the removal of carbon monoxide and carbon dioxide.

6. In the process of producing hydrogen from the steam thermal cracking of gas containing hydrocarbons, the steps of subjecting effluent gas from the primary steam reforming stage of said process to treatments for the removal of carbon monoxide and carbon dioxide and to a second steam hydrocarbon reforming stage in the absence of air and at a pressure of about 7.5 p.s.i.g. and a temperature of from about 1350° F. to 1800° F. and further treating for the removal of carbon monoxide and carbon dioxide.

7. In the process of producing hydrogen from the steam thermal cracking of gas containing hydrocarbons, the steps of subjecting effluent gas from the primary steam reforming stage of said process to treatments for the removal of carbon monoxide and carbon dioxide and to a second steam hydrocarbon reforming stage in the absence of an oxidizer and at a pressure of about 7.5 p.s.i.g. and a temperature of 1500° F., there being about three parts by volume of steam for each part of gas to be reformed and further treating for the removal of carbon monoxide and carbon dioxide.

References Cited in the file of this patent

UNITED STATES PATENTS

| | | |
|---|---|---|
| 2,487,981 | Reed | Nov. 15, 1949 |
| 2,813,779 | Faatz | Nov. 19, 1957 |
| 2,864,772 | White | Dec. 16, 1958 |
| 2,975,044 | Pettyjohn et al. | Mar. 14, 1961 |
| 2,998,303 | Huebler | Aug. 29, 1961 |